(12) United States Patent
Court et al.

(10) Patent No.: US 8,715,605 B2
(45) Date of Patent: May 6, 2014

(54) METHOD FOR BURNING CARBONATED FUELS WITH COMBUSTION SMOKE FILTRATION BEFORE COMPRESSION

(75) Inventors: Philippe Court, Vincennes (FR); Arthur Darde, Paris (FR); Jean-Pierre Tranier, L'Hay-les-Roses (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 289 days.

(21) Appl. No.: 12/864,891

(22) PCT Filed: Jan. 21, 2009

(86) PCT No.: PCT/FR2009/050078
§ 371 (c)(1),
(2), (4) Date: Jul. 28, 2010

(87) PCT Pub. No.: WO2009/095581
PCT Pub. Date: Aug. 6, 2009

(65) Prior Publication Data
US 2010/0322843 A1    Dec. 23, 2010

(30) Foreign Application Priority Data
Jan. 28, 2008    (FR) .................................... 08 50501

(51) Int. Cl.
*C01B 31/20* (2006.01)
(52) U.S. Cl.
USPC ............................ 423/437.1; 95/278; 95/279

(58) Field of Classification Search
USPC ....................... 423/437.1, 220–234
See application file for complete search history.

(56) References Cited

U.S. PATENT DOCUMENTS

| | | | | |
|---|---|---|---|---|
| 4,639,257 A | * | 1/1987 | Duckett et al. ................. | 62/624 |
| 4,833,877 A | * | 5/1989 | Ahland et al. ................. | 60/781 |
| 5,100,635 A | | 3/1992 | Krishnamurthy et al. | |
| 5,376,354 A | | 12/1994 | Fischer et al. | |
| 6,855,303 B1 | * | 2/2005 | Mowery-Evans et al. . | 423/239.1 |

FOREIGN PATENT DOCUMENTS

| | | |
|---|---|---|
| DE | 9418234 | 3/1996 |
| JP | 55-119417 | 9/1980 |
| JP | 02-146497 | 6/1990 |
| JP | 04-227017 | 8/1992 |
| JP | 04-350303 | 12/1992 |
| JP | 11-285617 | 10/1999 |
| JP | 2000-143204 | 5/2000 |
| JP | 2002-035518 | 2/2002 |
| JP | 2002-102647 | 4/2002 |
| JP | 2005-154920 | 6/2005 |
| WO | 91/13290 | 9/1991 |
| WO | 99/51367 | 10/1999 |

OTHER PUBLICATIONS

Peukert, et al., Industrial separation of fine particles with difficult dust properties, Powder Technology 2001; 118: 136-148.*

(Continued)

*Primary Examiner* — Daniel C McCracken
(74) *Attorney, Agent, or Firm* — Elwood L. Haynes

(57) ABSTRACT

A process for the combustion of a carbon-containing fuel, wherein the flue gases are filtered so as to achieve a solid particle concentration of less than 1 mg/m$^3$ before compression, purification and sequestration or transport is presented.

13 Claims, 3 Drawing Sheets

(56) References Cited

OTHER PUBLICATIONS

Siret, Bernard, "Depoussierage et Devesiculage" Techniques de l'Ingenieur, traite Genie des procedes, J 3 580, pp. 1 to 26.

Bontemps, Andre et al., Echageurs de Chaleur, Techniques de l'Ingenieur, traite Genie des procedes, B 2 341, pp. 3 to 4, 7 to 13.
PCT Search Report for PCT/FR2009/050078.
JP 2010-543549, Office Action issued Jun. 18, 2013.
JP 2010-543549, Partial Translation of References.

* cited by examiner

METHOD FOR BURNING CARBONATED FUELS WITH COMBUSTION SMOKE FILTRATION BEFORE COMPRESSION

CROSS-REFERENCE TO RELATED APPLICATIONS

This application is a §371 of International PCT Application PCT/FR2009/050078, filed Jan. 21, 2009, which claims priority to French Application 0850501, filed Jan. 28, 2008, the entire contents of which are incorporated herein by reference.

FIELD OF THE INVENTION

The present invention relates to a process for the combustion of a carbon-containing fuel, characterized in that the flue gases are filtered so as to achieve a solid particle concentration of less than 1 mg/m$^3$ before compression, purification and sequestration or transport.

BACKGROUND

Climate change constitutes one of the greatest environmental challenges. The increase in carbon dioxide concentration in the atmosphere is in very large part the cause of global warming. $CO_2$ of human origin is essentially emitted into the atmosphere through the combustion of fossil fuels in thermal power stations.

Thermal power stations, by burning fuels, release heat that can be used to produce steam and optionally mechanical or electrical energy. The flue gases release large quantities of $CO_2$ into the atmosphere.

To combat $CO_2$ emissions, one technology aims to capture the $CO_2$ emitted during the combustion of carbon-containing fuels in order to transport and/or sequester it underground. However, in order for such $CO_2$ capture to be possible, some of the flue gases have to be compressed up to a pressure of typically around 4 to 60 bar abs before being purified and then further compressed up to a pressure of typically 100 to 200 bar abs in order to be sequestered.

The technology for compressing gases in so high a volume and to such compression levels requires at the present time the use of centrifugal compressors in which bladed wheels eject gas centrifugally. To reduce the energy consumption, these compressors are multi-staged, a refrigerant being used to bring the gas down to ambient temperature at each stage.

Both compression wheels and interstage heat exchangers are subject to being fouled by the solid particles resulting from the combustion. The particles may block heat exchangers and reduce their thermal capabilities. As regards compressor wheels, these may become unbalanced by the nonuniform build-up of mass on the wheels. This results in mechanical shaft imbalance, vibrations and potentially machine destruction.

Another technology for compressing gases in so large a volume is what is called "axial" technology, in which rotor fins, rotating at high speed, alternating with stationary stator fins, compress the gas along the axis of the rotor of the machine. In such a technology, the presence of solid particles results in a loss of material on the fins, especially by erosion.

The situation is therefore confronted with a dust collection problem. The term "dust collection" is understood to mean any action or process in which a smoke or a gas is stripped of a substantial fraction of the solids that it contains by a gas/solid separation. Items of apparatus or equipment performing this task are called dust collectors or dust separators.

As mentioned in the document by B. Siret, entitled "Dépoussiérage et dévésiculage [Dust and mist collection]", Techniques de l'Ingénieur, J 3 580, pages 1 to 26, the technologies traditionally installed for solving the dust collection problem when a carbon-containing fuel is burnt are of various types, among which the following may be distinguished:

- electrostatic filters in which the charged particles are removed from the flue gas stream;
- bag filters in which the flue gases pass through a filter cloth;
- cyclones in which the particles are separated by centrifugation and acceleration; and
- scrubbers in which the flue gases are brought into contact with a liquid shower.

These technologies serve to lower the dust content from conventional levels of grams or tens of grams per cubic meter at the boiler outlet to levels a thousand times lower, in line with the usual standards for discharging into the atmosphere, but always greater than 1 mg/m$^3$.

However, with a flue gas dust content of 1 mg/m$^3$ or higher, the compression operation will suffer clogging, especially in the intermediate refrigerants, requiring stoppages for frequent maintenance. Moreover, this degrades the compression performance.

Starting from this situation, a problem that arises is how to provide a process for the combustion of carbon-containing fuels with improved flue gas treatment, especially a treatment suitable for centrifugal compressor technology.

SUMMARY OF THE INVENTION

One solution according to the invention is a process for the combustion of carbon-containing fuels, employing a combustion unit that produces flue gases comprising, in addition to carbon dioxide ($CO_2$), solid particles and at least one of the impurities chosen from water, nitrogen, oxygen, argon, nitrogen oxides (NOx), including nitrogen monoxide and nitrogen dioxide, and sulfur oxides (SOx), including sulfur dioxide, characterized in that the following steps are carried out:

a) filtration of the flue gases so as to achieve a solid particle concentration of less than 1 mg/m$^3$;
b) compression of the flue gases filtered at step a);
c) purification of the flue gases compressed at step b) so as to at least partly eliminate one of the impurities; and
d) recovery of a $CO_2$-enriched gas stream.

Preferably, the flue gases are compressed at step b) to a pressure above 4 bar.

Preferably, the compression used at step b) is produced by means of centrifugal compressors.

A solid particle concentration of less than 500 µg/m$^3$, more preferably less than 300 µg/m$^3$, is preferably achieved at step a).

Depending on the case, the process according to the invention may have one of the following features:

- the flue gases are filtered at step a) so as to achieve a solid particle concentration of less than 100 µg/m$^3$;
- the filtration at step a) is carried out using a cartridge filter;
- either the flue gases have not been saturated with water before step a) or a flue gas desaturation step is carried out before filtration step a);
- step a) is carried out after a first compression of the flue gases;
- at least one heat exchanger is used downstream of filtration step a) and upstream of step c);
- the combustion unit is a unit employing air as oxidant, in which unit $CO_2$ capture is carried out by absorbing the $CO_2$ in the flue gases, this being referred to as "post-combustion" capture;

the combustion unit is an oxyfuel combustion unit employing a gas depleted in nitrogen relative to air as oxidant;

the filtration of step a) is completed between step a) and step c) by a static filtration, the flue gases output from the static filtration have a solid particle concentration of less than 10 µg/m$^3$, in the case of flue gases with a temperature above 100° C., at least one heat exchanger, selected from plate heat exchangers, finned-tube heat exchangers and brazed aluminum heat exchangers, is employed downstream of filtration step a), in the case of flue gases with a temperature below 100° C., plastic heat exchangers are employed downstream of filtration step a), compact heat exchangers are employed downstream of filtration step a).

packed scrubbing towers and/or packed distillation columns are used downstream of filtration step a) for at least partly eliminating at least one of the impurities selected from $SO_2$, $NO_2$, $N_2$, $O_2$, Ar and $N_2O_4$.

a desulfurization step and/or a cooling step are used, upstream of filtration step a) and/or downstream of filtration step a), in order to remove the water by condensing it, the oxyfuel-combustion flue gases are divided into at least two portions, a first portion being recycled into the combustion unit and a second portion undergoing steps b), c) and d), and only the second portion undergoes a desulfurization step and/or a cooling step in order to remove the water by condensing it, all of the flue gases undergo at least one desulfurization step before a first portion of the desulfurized flue gases is recycled into the boiler whereas a second portion of the desulfurized flue gases undergoes steps a), b), c) and d).

the carbon-containing fuel is coal and the first flue gas portion undergoes a second desulfurization step before being returned to the boiler, all of the combustion flue gases undergo a first desulfurization step before filtration step a) and then a second desulfurization step after filtration step a), before being divided into two portions, a first flue gas portion being recycled into the boiler and a second flue gas portion undergoing steps b), c) and d).

It should be noted that, in the context of oxyfuel combustion, the recycled portion of the flue gases may represent up to 80% of the flue gases.

The term "post-combustion" is understood to mean a conventional combustion process in air followed by separation of the $CO_2$ from the flue gases, for example by amine absorption or ammonia absorption.

The desulfurization steps may for example be carried out by scrubbing using a solution that contains lime or sodium hydroxide.

Filtration step a), called "fine filtration", may be carried out using a cartridge filter. It is carried out at a temperature between 0° C. and 300° C., preferably between 100° C. and 200° C. The term "cartridge filter" refers to filtering cartridges consisting of pleated fibrous media used in cylindrical form. This filter technology provides large filtration areas for a low occupied volume and a lower pressure drop generated for the same flow rate of gas to be treated. This is because the pleating operation increases the filter area used in a line of given cross section and thus makes it possible to reduce the flow-through velocity of the gas in the filter, thereby reducing the pressure drop.

After filtration, cartridge filters are declogged using a $CO_2$-rich fluid or even air. This $CO_2$-rich fluid may result from step b) and/or step d).

The term "compact heat exchanger" is understood to mean a heat exchanger having a compactness, defined as the ratio of the exchange surface area to the volume of the heat exchanger, greater than 700 m$^2$/m$^3$.

Finned-tube heat exchangers consist of tubes enabling the heat exchange coefficient to be improved. Various types of finned-tube heat exchanger exist. In the context of the present invention, it is possible for example to use a finned battery consisting of a bundle of tubes, distributed in rows or sheets, through which a heat-transfer fluid having a good exchange coefficient flows.

The "plate heat exchanger" is understood to mean a primary-surface or secondary-surface heat exchanger. Primary-surface heat exchangers are formed from corrugated, ribbed or studded plates. The design of the plate profile may be quite varied, but it always has two roles, namely heat transfer intensification and pressure retention by multiplication of contact points. Among primary-surface heat exchangers are those with welded or brazed plates, making it possible to use these primary heat exchange surfaces at temperatures above 150° C. In the context of the present invention, these heat exchangers may be used, unconcerned about fouling, because of the prior use of filtration step a). Secondary-surface heat exchangers use pleated or corrugated fins.

The document A. Bontemps et al., entitled "Echangeurs de chaleur [*Heat exchangers*]", Techniques de l'Ingénieur, B 2 3241, pages 3-4 and 7 to 13 describes the various types of finned-tube heat exchangers and plate heat exchangers.

Another technology that can be used in filtration step a) is based on filtration by media made of a plastic, such as, for example, PPS (polyphenylene sulfide), polyester and PTFE (polytetrafluoroethylene). These plastics allow submicron filtration levels to be achieved while at the same time withstanding, depending on the case, temperatures between 50° C. and 200° C.

The term "static filter" is understood to mean a coarse and/or fine filter, preferably a fine filter, or a combination of coarse then fine filters. The term "fine filter" is understood to mean a filter of class F5 to F9 according to the European standard EN 779 (2002). This may for example be a pocket static filter or a cassette static filter, typically measuring 24 inches by 24 inches (610 mm by 610 mm approximately). The term "coarse filter" is understood to mean a filter of class G1 to G4.

The static filter according to the invention may be followed by an HEPA or ULPA filter. An HEPA filter is a filter of class H10 to H14 and a ULPA filter is a filter of class U15 to U17 according to the European standards EN 1822-1 (1998), 1822-2 (1998) and 1822-3 (1998).

The process according to the invention employs a combustion unit fed with a carbon-containing fuel. Preferably, this fuel is coal, but it could be any fuel based on carbon atoms, namely oil residues, hydrocarbons, natural gas, biomass, household waste, etc.

The combustion is preferably oxyfuel combustion, that is to say combustion in which the oxidant is a gas depleted in nitrogen relative to air and enriched with $CO_2$. This nitrogen depletion is obtained by separating air into an oxygen-enriched fraction and a nitrogen-enriched fraction, for example in a cryogenic air gas separation unit. The oxygen-enriched fraction is mixed with a recycled portion of the $CO_2$-rich flue gases in order to form the oxidant. This fraction generally has an oxygen concentration greater than air. It should be noted that the oxyfuel combustion may also be carried out in pure oxygen, i.e. without dilution with a portion of the $CO_2$-rich flue gases. Its content is then typically between 85% and 99.9%.

DETAILED DESCRIPTION OF THE INVENTION

For a further understanding of the nature and objects for the present invention, reference should be made to the detailed description, taken in conjunction with the accompanying drawings, in which like elements are given the same or analogous reference numbers and wherein:

The invention will now be described in greater detail with the aid of FIGS. 1 and 2.

Figure 1:
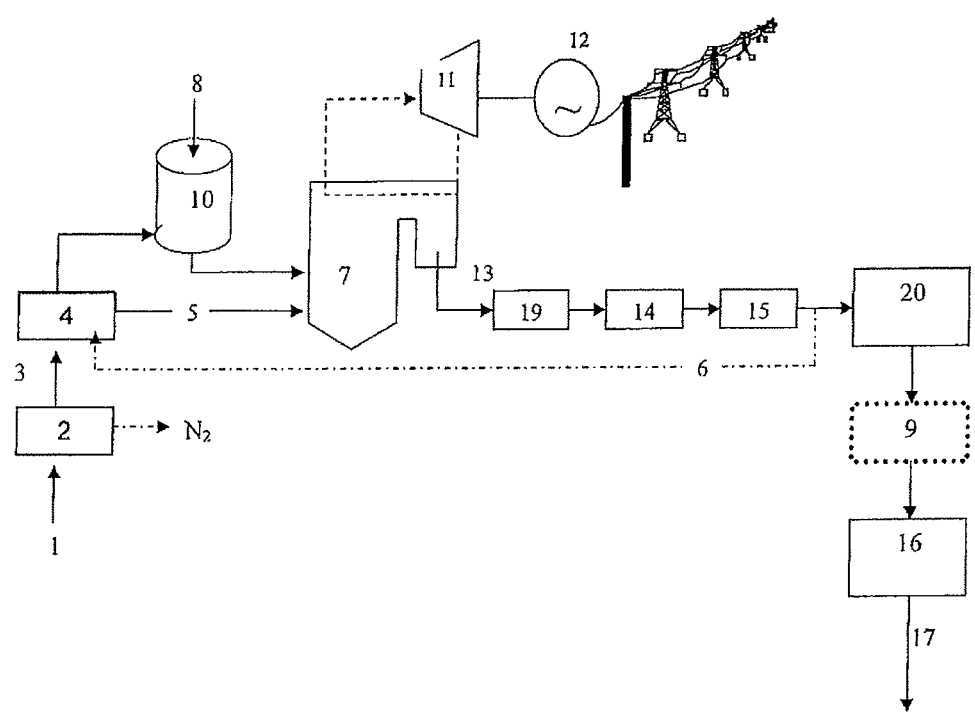
FIG. 1 illustrates the general process according to one embodiment of this invention, employing a pulverized-coal boiler operating with an oxidant leaner in nitrogen than air, wherein all of the flue gases undergo a desulfurization step.

FIG. 1 illustrates a general process according to the invention, employing a pulverized-coal boiler operating with an oxidant leaner in nitrogen than air, characterized in that all of the flue gases undergo a desulfurization step.

Air 1 is fed into the air gas separation unit 2, which then produces oxygen 3. The oxygen 3 is sent to a mixer 4 where it may be mixed, via a $CO_2$ recirculation line, with a $CO_2$-rich recycle gas 6. The oxidant 5 coming from the mixer 4 is then fed into the pulverized-coal boiler 7, which then operates with an oxidant leaner in nitrogen than air.

The fuel 8, here raw coal, is firstly sent to a pulverizer 10 before being fed into the pulverized-coal boiler 7.

The steam coming from the boiler is expanded in a steam turbine 11, which delivers mechanical work. This work is converted to energy by means of an alternator 12.

The flue gases 13 may undergo various treatments: removal of mercury (not shown) and nitrogen oxides 19, dust collection 14 and desulfurization and/or cooling 15.

A first portion 6 of these oxyfuel-combustion flue gases may be recycled into the boiler so as to lower the oxygen content in the combustion, and therefore the combustion temperature.

The non-recycled flue gases (i.e. the second flue gas portion) are filtered by means of a cartridge filter 20 before being sent to the $CO_2$ compression and purification unit (CPU) 16. Prior to the compression step 16, the flue gases may undergo scrubbing 9 with the purpose of eliminating SOx and/or NOx and/or cooling them by direct contact in order to remove some of the water therefrom by condensing it.

The purified $CO_2$ 17 coming from the CPU unit 16 may then be bottled and/or transported and/or stored.

The dust collection 14 is understood to mean dust collection using conventional techniques: for example dust collection by means of electrostatic filters or bag filters.

Figure 2:
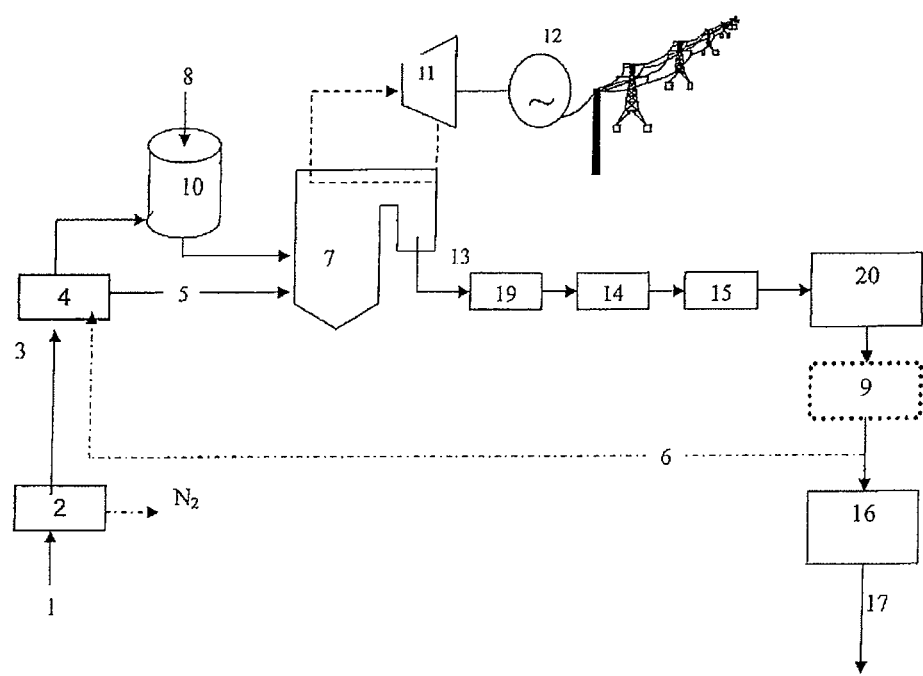
FIG. 2 illustrates a process according to one embodiment of this invention employing a pulverized-coal boiler and operating with an oxidant that is leaner in nitrogen than air, wherein all of the flue gases undergo a first desulfurization step before filtration step a) and then a second desulfurization step before being divided into two portions, a first flue gas portion being recycled into the boiler and a second flue gas portion undergoing steps b), c), and d).

FIG. 2 illustrates a process according to the invention employing a pulverized-coal boiler and operating with an oxidant that is leaner in nitrogen than air, characterized in that all of the flue gases undergo a first desulfurization step before filtration step a) and then a second desulfurization step before being divided into two portions, a first flue gas portion being recycled into the boiler and a second flue gas portion undergoing steps b), c), and d).

This process differs from the previous one in that:

all of the flue gases are filtered by means of a cartridge filter 20 before being sent to the scrubber 9 for eliminating SOx and/or NOx and/or cooled by direct contact in order to eliminate some of the water therefrom by condensation;

a first flue gas portion 6 may be recycled after the scrubber 9 into the boiler; and the non-recycled flue gases (the second flue gas portion) are sent to the $CO_2$ compression and purification unit (CPU) 16.

It should be noted that intermediate solutions, i.e. intermediate between that described in the case of FIG. 1 and that described in the case of FIG. 2, are conceivable. For example, the oxidant fraction going to the pulverizers may require a water removal step so as to vaporize the water contained in the coal, whereas the other portion of the oxidant 5 does not require this and is therefore recycled, as in FIG. 1.

Figure 3:
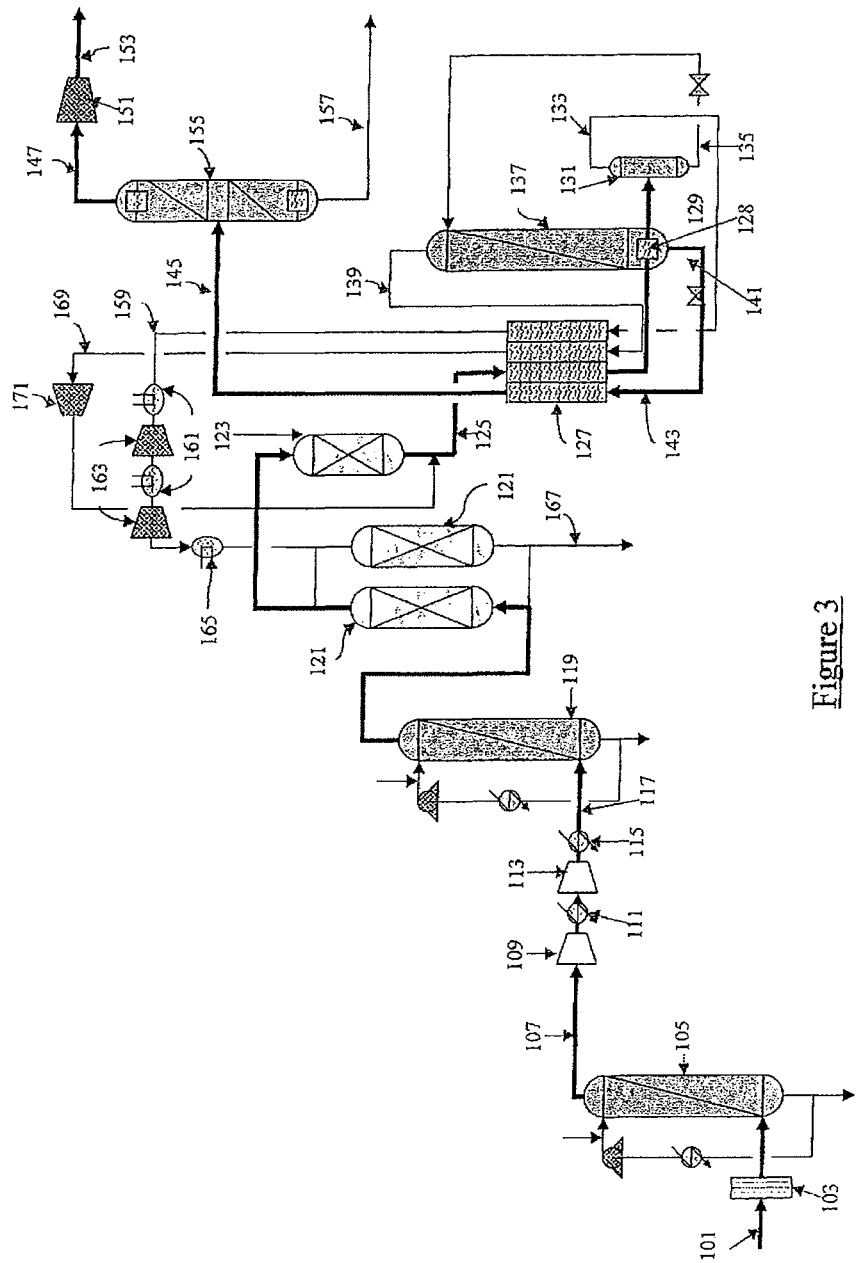
FIG. 3 illustrates a more detailed description of steps a), b), c) and d) of the process according to one embodiment of the present invention.

FIG. 3 provides a more detailed description of steps a), b), c) and d) of the process according to the invention.

To simplify the description, the flue gas filtration is "fine filtration" so as to achieve a solid particle concentration of less than 1 $mg/m^3$.

The oxyfuel-combustion flue gases 101 undergo fine filtration 103 and scrubbing/cooling in a direct-contact tower 105. The SOx and/or NOx may be removed in this tower. The low-pressure scrubbing tower may be a packed tower thanks to the fine filtration since a conventional filtration would result in the packing becoming fouled. It would then be necessary to clean the tower very often or to use trays, which are less subject to fouling but result in higher pressure drops. The cooled flue gases 107 enter a first compression stage 109 before being cooled in a heat exchanger 111 then enter a second compression stage 113 before being again cooled in a heat exchanger 115. These heat exchangers 111 and 115 may be finned or plate or compact heat exchangers thanks to the fine filtration. The pressure of the fluid 117 is typically between 4 and 60 bar abs, preferably between 15 and 35 bar abs. The number of compression stages is adapted according to the pressure. Each compression stage may consist of one or more centrifugal wheels. The fluid 117 then enters a high-pressure scrubbing/cooling tower 119, then is dried in an adsorber 121 before undergoing an adsorption demercuration step in an adsorber 123. The high-pressure scrubbing tower may have packings thanks to the fine filtration. The fluid 125 obtained then undergoes partial condensation in the heat exchangers 127 and 128. These heat exchangers may be made of brazed aluminum thanks to the fine filtration. Under certain circumstances, this fine filtration, sufficient for preventing the compressors from becoming fouled, may be insufficient for the use of such heat exchangers. Moreover, the drying and adsorption demercuration steps may introduce solid particles into the fluid. A supplementary filtration, for example using a sintered metal cartridge, may be carried out on the fluid 125. The partially condensed fluid is separated into a $CO_2$-enriched liquid fraction and a vapor fraction typically enriched with $N_2$, Ar, $O_2$. The liquid fraction is expanded and enriched with $CO_2$ in a distillation column 137. A gaseous fluid 139 is withdrawn from the column, heated in the heat exchanger 127 and then optionally compressed in a compressor 171 and recycled upstream of the heat exchanger 127 so as to improve the $CO_2$ yield. A liquid fluid 141 is optionally expanded and vaporized in the heat exchanger 127 before being introduced into a distillation column 155 in order to purify it of heavy compounds, such as $SO_2$ and $NO_2/N_2O_4$, which would not have been eliminated by the previous purification steps. The distillation columns may be packed columns thanks to the use of fine filtration. A liquid fraction 157 enriched with heavy compounds is extracted from this column and a $CO_2$ enriched fraction is produced and compressed in a compressor 151 ready for sequestration at a pressure typically between 100 and 200 bar abs. The gaseous fraction 133 is heated in the heat exchanger 127 and expanded in one or more steps in turbines 163, said gaseous fraction having been preheated in heat exchangers 161 so as to recover the energy in pressure form. This fluid then enters the heater 165 and serves to regenerate the adsorber 121.

As an example, the combustion process according to the invention may use an oxyfuel combustion unit producing oxyfuel-combustion flue gases comprising about 55% $CO_2$, 20% $H_2O$, 20% $N_2$, 5% $O_2$ and argon and traces of other impurities, said process being characterized by the recovery at step d) of a gaseous stream comprising at least 90% $CO_2$, preferably at least 95% $CO_2$.

The process according to the invention has in particular the following advantages:
- use of heat exchangers more effective than smooth tubes, which are the only heat exchangers that can be used with a dust content greater than 1 $mg/m^3$,
- better compression,
- fewer stoppages for maintenance over a given time period,
- use of scrubbing towers and/or distillation columns fitted with packings instead of trays, thus resulting in lower pressure drops and likewise improving the energy efficiency of the system; and
- improvement in the purity of the end-product in terms of solid particles, thereby reducing downstream equipment fouling, and especially in pipelines.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for treating flue gases comprising carbon dioxide, solid particles and at least one impurity selected from the group consisting of: water, nitrogen, oxygen, argon, nitrogen oxides, and sulfur oxides, said process comprising:
    a) filtrating the flue gases, thereby achieving a solid particle concentration of less than 100 $\mu g/m^3$., wherein the filtration is carried out using a cartridge filter, wherein the cartridge filter is declogged using a CO2 rich fluid;
    b) compressing the flue gases filtered at step a);
    c) purifying the flue gases compressed at step b), thereby at least partly eliminating at least one of the impurities; and
    d) recovering a $CO_2$-enriched gas stream.

2. The process of claim 1, wherein the nitrogen oxides include nitrogen monoxide and nitrogen dioxide.

3. The process of claim 1, wherein the sulfur oxides include sulfur dioxide.

4. The process of claim 1, wherein either the flue gases have not been saturated with water before step a) or a flue gas desaturation step is carried out before filtration step a).

5. The process of claim 1, wherein step a) is carried out after a first compression of the flue gases.

6. The process of claim 1, wherein at least one heat exchanger is used downstream of filtration step a) and upstream of step c).

7. The process of claim 1, wherein the filtration of step a) is completed between step a) and step c) by a static filtration.

8. The process of claim 1, wherein the flue gases output from the static filtration have a solid particle concentration of less than 10 $\mu g/m^3$.

9. The process of claim 1, wherein, in the case of flue gases with a temperature above 100° C., at least one heat exchanger, selected from the group consisting of plate heat exchangers, finned-tube heat exchangers and brazed aluminum heat exchangers, is employed downstream of filtration step a).

10. The process of claim 1, wherein, in the case of flue gases with a temperature below 100° C., plastic heat exchangers are employed downstream of filtration step a).

11. The process of claim 1, wherein compact heat exchangers are employed downstream of filtration step a).

12. The process of claim 1, wherein packed scrubbing towers and/or packed distillation columns are used downstream of filtration step a) for at least partly eliminating at least one of the impurities selected from the group consisting of $SO_2$, $NO_2$, $N_2$, $O_2$, Ar and $N_2O_4$.

13. The process of claim 1, wherein a desulfurization step and/or a cooling step are used, upstream of filtration step a) and/or downstream of filtration step a), in order to remove the water by condensing it.

* * * * *